Figure 1:
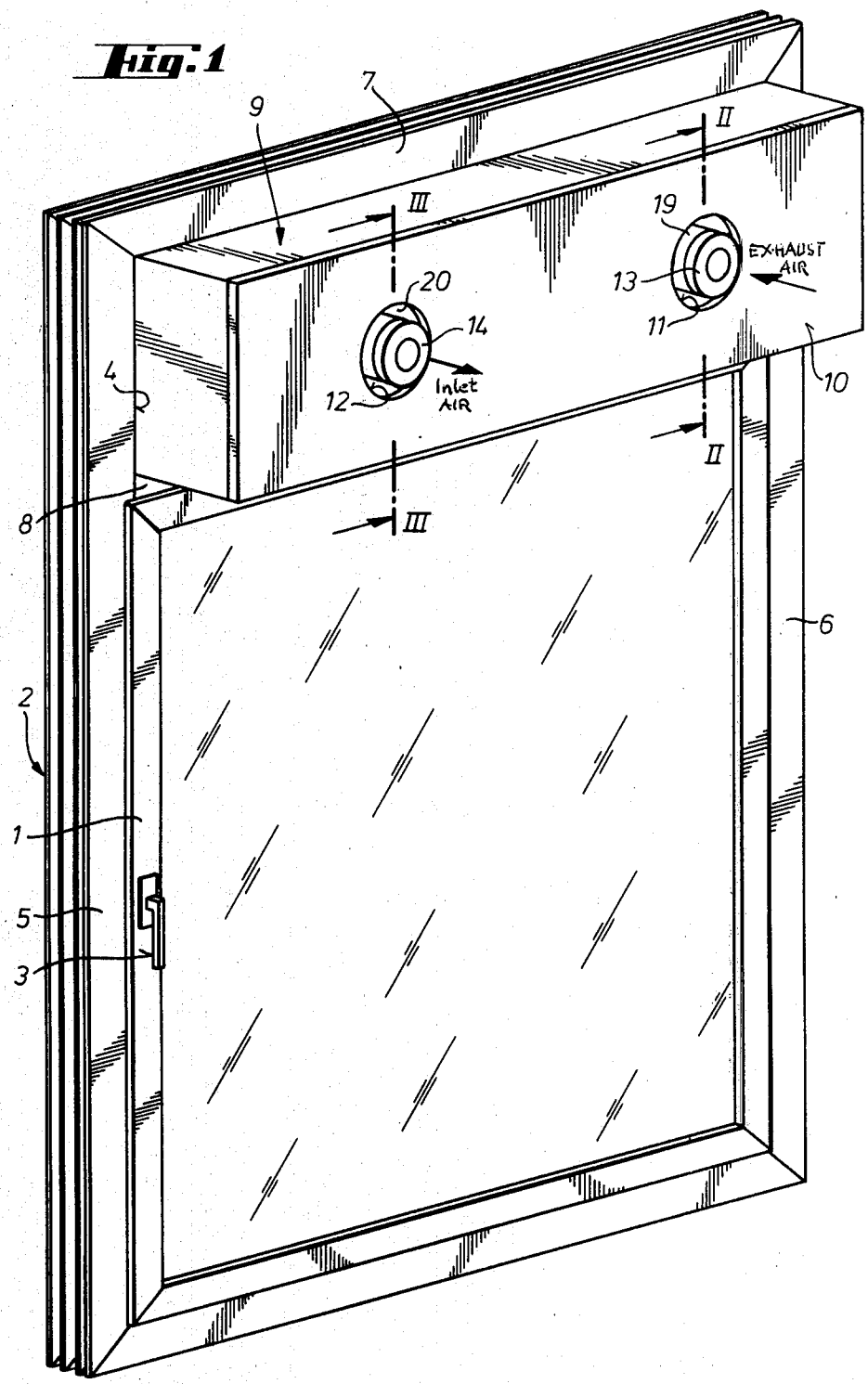

United States Patent [19]

Frank

[11] 4,338,996
[45] Jul. 13, 1982

[54] COMBINED ROLLING SHUTTER AND VENTILATING BOX

[76] Inventor: Wilhelm Frank, Rohrer Str. 120, 7022 Leinfelden, Fed. Rep. of Germany

[21] Appl. No.: 161,652

[22] Filed: Jun. 19, 1980

[30] Foreign Application Priority Data

Jun. 21, 1979 [DE] Fed. Rep. of Germany ... 7917750[U]

[51] Int. Cl.³ .............................................. F28D 7/12
[52] U.S. Cl. ..................................... 165/57; 165/122; 160/26; 160/127
[58] Field of Search ............. 165/54, 57, 122, DIG. 4, 165/DIG. 12; 160/26, 127

[56] References Cited

U.S. PATENT DOCUMENTS 4,222,436 9/1980 Pravda ..................... 165/DIG. 12 X

FOREIGN PATENT DOCUMENTS 7813587 8/1978 Fed. Rep. of Germany .
7820247 10/1978 Fed. Rep. of Germany .
2743904 4/1979 Fed. Rep. of Germany ........ 160/26
578157 7/1976 Switzerland ................ 165/DIG. 12

Primary Examiner—Albert J. Makay
Assistant Examiner—Harold Joyce
Attorney, Agent, or Firm—Kurt Kelman

[57] ABSTRACT

A combined rolling shutter and ventilating box comprises a housing holding the rolling shutter. A ventilating box has horizontal and vertical air duct sections divided into a first duct section part receiving warm air to be exhausted from an interior room and a second duct section part receiving fresh air from the atmosphere. A ventilator exhausts the warm air through the first duct section part and the exhausted warm air is vented to the atmosphere. A fresh air inlet communicates with the second duct section and a ventilator draws the fresh air therethrough. A heat exchanger in the air duct sections extends transversely through the air flow through the first and second duct parts.

1 Claim, 3 Drawing Figures

COMBINED ROLLING SHUTTER AND VENTILATING BOX

The improvement relates to a rolling shutter ventilating box for mounting on a shutter frame of a window, a door or the like having a ventilating duct defined, on the one hand, by an interiorly arranged cover and a transverse wall of the box and, on the other hand, by a housing arranged in the box and covering the shield of the rolling shutter, the duct being divided into an air inlet duct and an air exhaust duct, and at least one ventilator arranged in the region of the duct between the cover and the vertical dividing wall of the housing, a heat exchanger which is comprised particularly of heat exchange tubes arranged consecutively in the direction of air flow and staggered in relation to each other transversely of the duct, the heat exchanger extending over both individual ducts, as well as an air supply opening leading to the air inlet duct and arranged adjacent the exterior wall of the box in the horizontal dividing wall, and an air supply opening leading to the air exhaust duct and arranged in the cover outside of the duct section defined by the horizontal dividing wall and the transverse wall.

A rolling shutter box is known from German utility model No. 7,813,587 which is provided with an air inlet opening and an air exhaust opening in its rear wall facing the room and usually formed as a removable cover so that the room may be ventilated through the rolling shutter box, even with a closed window and independently of the position of the rolling shutter shield. To avoid in case the room is heated, for example, escape of the heat energy contained in the exhaust air into the atmosphere without being used, a heat exchanger formed by heat exchange tubes is arranged in the rolling shutter box, the heat exchanger simultaneously overlapping the air exhaust opening and the air inlet opening in the rear wall. The heat exchange tubes are arranged in the immediate region of these openings. The heat exchange tubes withdraw a large part of the heat energy from the exhaust air, lead it to the air inlet opening and transfer this heat energy to the cold air supply so that it enters in this preheated condition into the heated room. Due to this heat recovery, the room temperature is thus essentially maintained despite adequate ventilation.

In such a rolling shutter ventilating box, it is further known from German utility model No. 7,820,247 to cover the roll formed by the rolling shutter shield with a housing within the box to define a definite ventilating duct which is divided into an air inlet duct and an air exhaust duct. The air inlet opening for the air inlet duct is located near the outer wall of the box in the horizontal dividing wall of the housing. The air inlet opening of the air exhaust duct is arranged in the cover outside of the duct section defined by the horizontal dividing wall of the housing and the transverse wall of the box.

By arranging the heat exchange tubes in the vertical region of the individual ducts, that is between the cover and the vertical dividing wall of the housing, only a portion of the air is conducted over the entire length of the heat exchange tubes arranged consecutively in the direction of the air flow and staggered in relation to each other. This is caused by the fact that the bundle of heat exchange tubes on the one hand extends essentially only over the range of the air inlet and exhaust opening in the cover so that the air flowing in the upper region of these openings is no longer conducted over all heat exchange tubes. On the other hand, the openings in the cover are limited in their width so that only a small portion of the length of the heat exchange tubes arranged immediately behind the openings can be used for the energy exchange. This has the result that the available efficiency of the heat exchange tubes is used only insufficiently.

Therefore, the object of the improvement is to enhance the efficiency of the heat exchanger in a rolling shutter ventilating box with heat exchanger considerably.

This object is accomplished by arranging the heat exchanger in the duct section defined by the horizontal dividing wall of the housing and the transverse wall of the box.

Because of the repositioning of the heat exchanger from the vertical portion of the individual ducts to the horizontal duct section, the entire flow of air always runs through the entire length of the heat exchanger in the direction of air flow, that is the entire bundle in case a bundle of heat exchange tubes is used. This considerably enhances the energy exchange between the heat exchange tubes and the flowing air because it provides more contact points. The energy exchange is additionally increased because the air supplied to the heat exchange tubes acts on the heat exchange tubes no longer only in the region of the air exhaust and air supply openings but over the entire length of the heat exchange tubes in each individual duct. The contact opportunities of the air with the heat exchange tubes are additionally increased by re-directing the air ahead of the heat exchange tubes. This causes a turbulence of the air which further increases the contact opportunities of the air with the heat exchange tubes. This produces a considerably improved efficiency of the heat exchange tubes since the heat energy withdrawn from the exhaust air is substantially increased and the heating of the fresh inlet air thus has an added amount of energy available. This assures that the temperature of the room is not reduced even without an additional amount of heating energy supplied to the room even at a stronger degree of ventilation.

Additional advantages and details of the subject matter of the improvement may be gleaned from the drawings which show schematically a preferred embodiment by way of example. Shown are in FIG. 1 a perspective elevational view of a window with a built-in rolling shutter ventilating box, FIG. 2 a section through the exhaust air duct of the rolling shutter ventilating box according to line II—II of FIG. 1 and FIG. 3 a section through the inlet air duct according to line III—III of FIG. 1.

The window illustrated in FIG. 1 has a wing 1 which is hinged to a shutter frame 2 and which may be operated by an actuating handle 3. Shutter frame 2 has an opening 4 which is defined by lateral struts 5, 6, upper horizontal strut 7 and transom 8. Rolling shutter or roller blind ventilating box 9 is inserted in this opening 4. Cover 10 of this box 9 defines an inlet air opening 11 for an exhaust air duct 19 for exhausting warm exhaust air and an exhaust air opening 12 for an air inlet duct 20 for supplying the fresh air. A ventilator or blower 13, 14 is respectively associated with openings 11, 12 for automatic ventilation.

Figure 2:
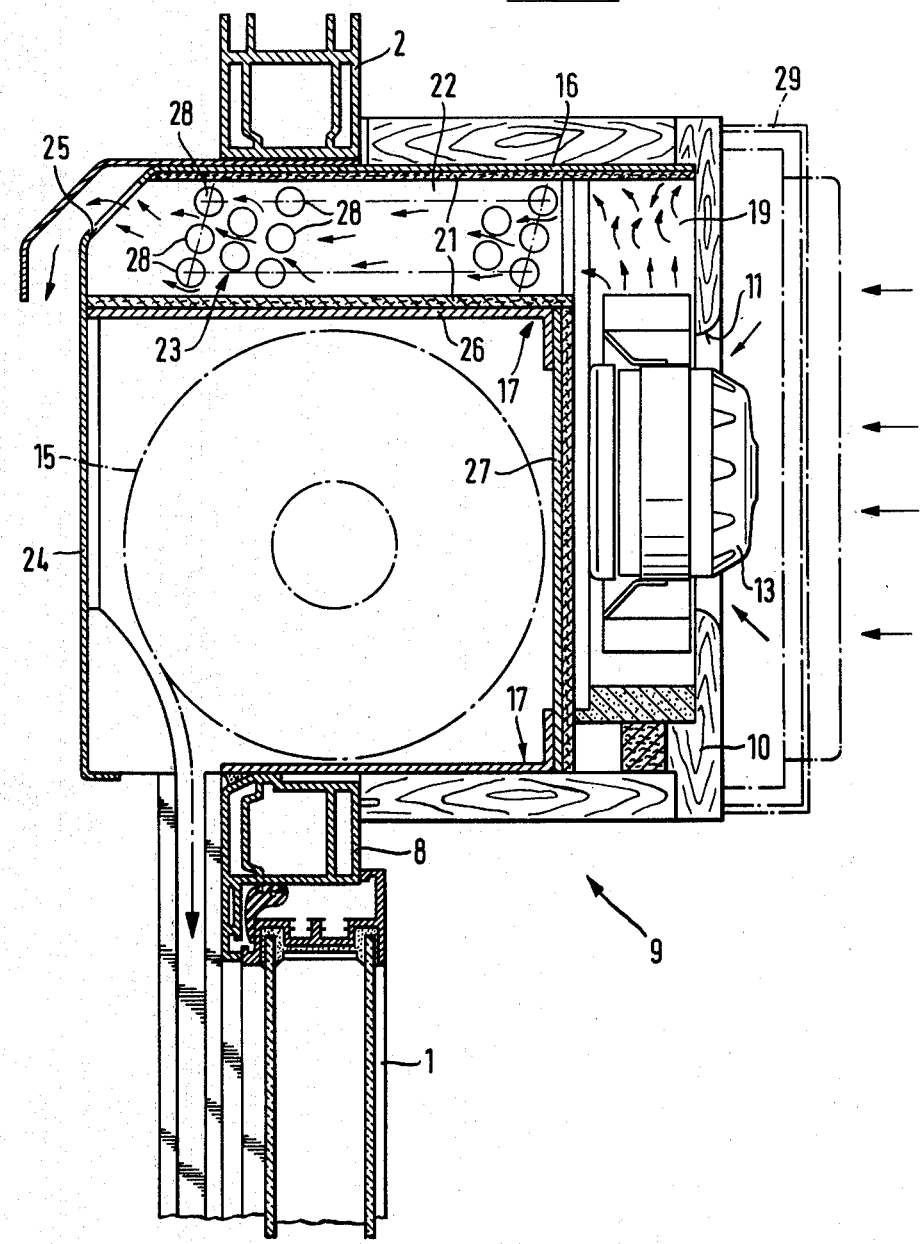
Figure 3:
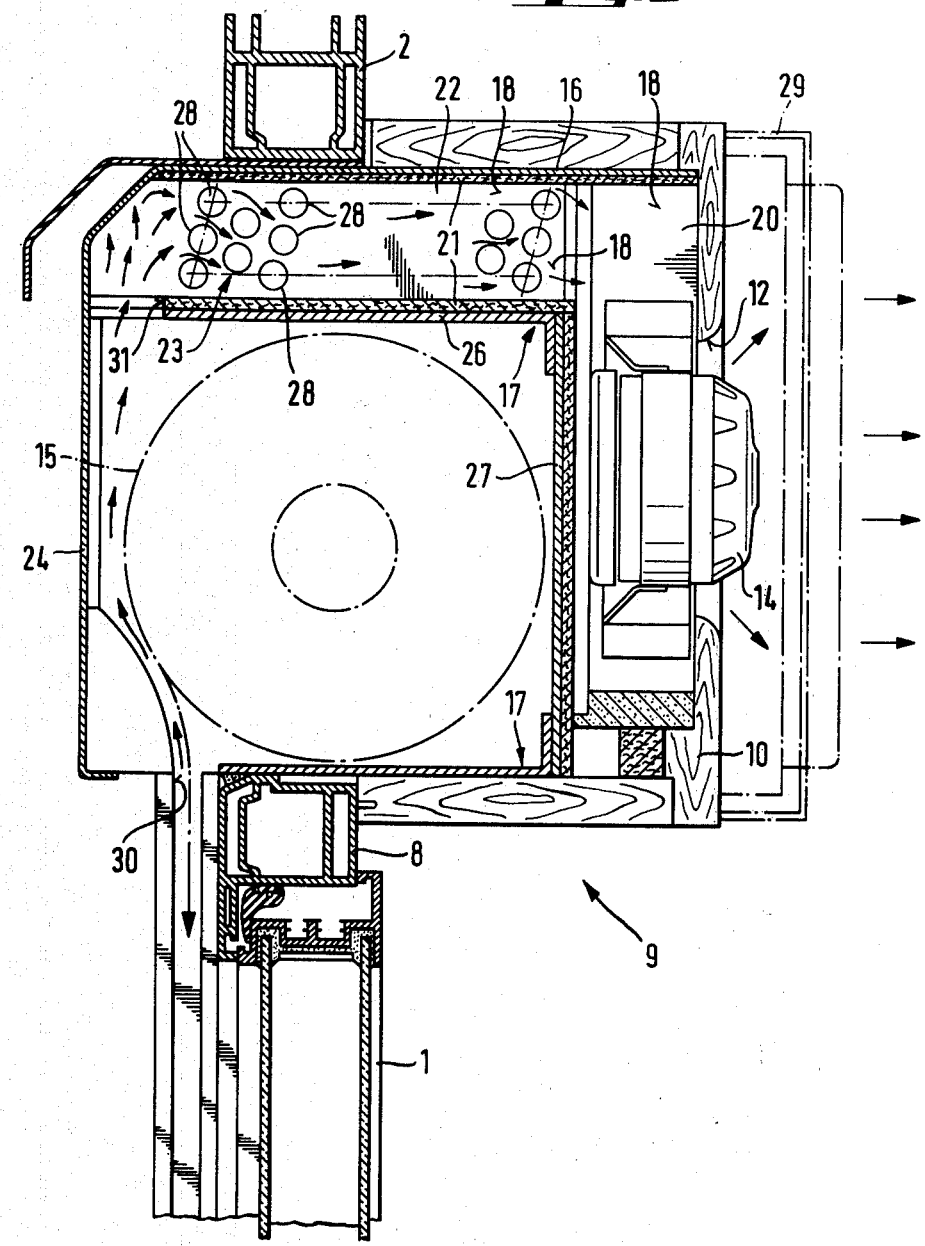

As can be seen in FIGS. 2 and 3, a rolling shutter or roller blind shield 15 is mounted in the interior of box 9 and is separated by a housing 17. The ventilating duct is defined by transverse wall 16 of box 9 and horizontal dividing wall 26 of housing 17 as well as cover 10 of box 9 and vertical dividing wall 27 of housing 17. The ventilating duct is divided into an inlet air duct 20 and an exhaust air duct 19 by a web 18 arranged perpendicularly on horizontal dividing wall 26 and vertical dividing wall 27. Both individual ducts 19, 20 are lined with damping material 21. A heat exchanger 23, whose heat exchange tubes 28 are arranged consecutively in the direction of the air flow and staggered in relation to each other over the entire cross section of duct section 22, is arranged in duct section 22 defined by transverse wall 16 of box 9 and horizontal dividing wall 26 of housing 17 and extends over both individual ducts 19, 20.

A ventilator 13, 14 is associated respectively with the openings 11, 12 at the inside of cover 10. As shown in chain-dotted lines, a sound damper 29 having air slots may be arranged on cover 10 to damp the sound.

Exhaust air duct 19 seen in FIG. 2 has an inlet air opening 11 in cover 10 through which the warm exhaust air is sucked by ventilator 13. The flow of exhaust air impinges upon transverse wall 16 of box 9, is diverted by 90° and is conducted to heat exchange tubes 28 in a turbulent condition. The flow of exhaust air passes through the entire length of the bundle of heat exchange tubes 28, divided over the entire width of exhaust air duct 19. This provides a multiplicity of contact points exhaust air/heat exchange tube 28 as well as large exchange areas so that a large portion of its heat energy is withdrawn from the exhaust air. The cooled exhaust air enters the atmosphere through venting slots 25 in outer wall 24 of box 9.

The heat energy withdrawn from the exhaust air by heat exchange tubes 28 is conducted by heat exchange tubes 28 to the air inlet duct 20 which receives cold fresh air through guide slot 30 of the rolling shutter and inlet air opening 31 in horizontal dividing wall 26 near outer wall 24. The flow of fresh air is also diverted by 90° ahead of heat exchange tubes 28 and is thereby made turbulent. In passing through the heat exchange tubes 28, the cold fresh air stream receives the heat energy withdrawn from the stream of exhaust air and is thereby heated.

I claim:

1. A combined rolling shutter and ventilating box arrangement mounted on a window frame defining a plane dividing an interior room from the atmosphere, which comprises a ventilating box mounted on the window frame and having a vertical cover facing the interior room, an outer wall facing the atmosphere and a horizontal wall interconnecting the cover and the outer wall, the vertical cover and the outer wall extending parallel to the plane, a housing holding the rolling shutter, the rolling shutter being arranged in the housing for unreeling through an opening in the housing, the opening communicating with the atmosphere and guiding the unreeled shutter for extension parallel to the plane whereby the unreeled shutter shields the plane from the atmosphere, the outer wall of the ventilating box forming one vertical wall of the housing and the housing having another vertical wall parallel to the one vertical wall and close to the vertical cover as well as a horizontal wall interconnecting the vertical walls and close to the horizontal wall of the ventilating box, the horizontal walls defining an air duct section above the housing and the vertical cover and other vertical wall defining another duct section communication with the air duct section and extending perpendicularly thereto, the duct sections being divided into a first duct section part for receiving warm air to be exhausted from the interior room and a second duct section part for receiving fresh air from the atmosphere, the cover defining a first opening in communication with the first duct section part, a ventilator in the first opening for exhausting the warm air from the interior room, the ventilator forcing the exhausted warm air through the first duct section part in a path having a vertical component in the other duct section and a horizontal component in the air duct section, diversion of the exhausted warm air from the vertical to the horizontal path component causing turbulence therein, venting means in the box at the end of the path for venting the exhausted warm air to the atmosphere, a fresh air inlet in the horizontal wall of the housing in substantially vertical alignment with the opening in the housing, the housing defining a vertical fresh air inlet channel between the opening and the air inlet, the air inlet being in communication with the second duct section whereby fresh air is received from the fresh air inlet channel in the second duct section part, diversion of the fresh air from the vertical fresh air inlet channel to the horizontal second duct section part causing turbulence therein, the cover defining a second opening in communication with the second duct section part, a ventilator in the second opening for drawing the fresh air from the atmosphere through the air inlet channel and the second duct section part, and a heat exchanger in the air duct section, the heat exchanger being comprised of a series of heat exchange tubes extending transversely to the air flow through the first and second duct section parts, the heat exchange tubes being staggered in relation to each other and the fresh air and exhausted warm air flowing in turbulent condition over the staggered tubes.

* * * * *